(12) United States Patent
Huff et al.

(10) Patent No.: US 9,024,473 B2
(45) Date of Patent: May 5, 2015

(54) POWER COMBINING IN POWER OVER ETHERNET SYSTEMS

(75) Inventors: Ryan Huff, Santa Barbara, CA (US); Jeffrey Lynn Heath, Santa Barbara, CA (US)

(73) Assignee: Linear Technology Corporation, Milpitas, CA (US)

(*) Notice: Subject to any disclaimer, the term of this patent is extended or adjusted under 35 U.S.C. 154(b) by 509 days.

(21) Appl. No.: 13/590,043

(22) Filed: Aug. 20, 2012

(65) Prior Publication Data

US 2013/0049469 A1   Feb. 28, 2013

Related U.S. Application Data

(60) Provisional application No. 61/528,917, filed on Aug. 30, 2011.

(51) Int. Cl.
| | | |
|---|---|---|
| *H04L 12/10* | (2006.01) | |
| *G06F 1/26* | (2006.01) | |
| *H02J 1/10* | (2006.01) | |

(52) U.S. Cl.
CPC ............... *H04L 12/10* (2013.01); *G06F 1/266* (2013.01)

(58) Field of Classification Search
USPC .......................................................... 307/52
See application file for complete search history.

(56) References Cited

U.S. PATENT DOCUMENTS

2005/0122140 A1   6/2005   Peker et al.

FOREIGN PATENT DOCUMENTS

WO   2011063225 A2   5/2011

OTHER PUBLICATIONS

International Search Report and Written Opinion, 15 Pages, Aug. 21, 2012.

*Primary Examiner* — Robert Deberadinis
(74) *Attorney, Agent, or Firm* — Patent Law Group LLP; Brian D. Ogonowsky

(57) ABSTRACT

A technique for combining power to a single load from multiple power supplies using power over Ethernet (PoE) is disclosed. Each power supply is coupled to associated power sourcing equipment (PSE) providing PoE, and each PSE has a current limit. The power supplies supply approximately the same voltage, but the output voltages are typically not exactly equal. All the power supplies are connected via diodes to a common load terminal. The power supply outputting the highest voltage first supplies power to the load terminal, since only its diode is forward biased, until a PoE current limit is reached. Then its duty cycle is limited. The load terminal voltage is then inherently lowered to cause the diode of the power supply with the next highest output voltage to connect it to the load to supply additional power to the load as the first power supply continues to supply its limited current.

23 Claims, 2 Drawing Sheets

POWER COMBINING IN POWER OVER ETHERNET SYSTEMS

CROSS-REFERENCE TO RELATED APPLICATIONS

This application claims priority from U.S. provisional application Ser. No. 61/528,917, filed on Aug. 30, 2011, entitled PD Power Combining in Power Over Ethernet System, by Ryan Huff and Jeffrey Heath, incorporated herein by reference.

FIELD OF THE INVENTION

This invention relates to Power Over Ethernet (PoE) techniques and, in particular, to methods of increasing the power to a PoE-enabled Powered Device (PD) while conforming to the IEEE standards for PoE.

BACKGROUND

Many PoE customers want more power for a PD than the current IEEE standards allow. Some of these customers also want to remain fully compliant with the IEEE 802.3 PoE specification. The IEEE 802.3 specification is incorporated herein by reference. For these customers, the only way to get more power using PoE is to combine the power from two or more IEEE 802.3 compliant Power Sourcing Equipment (PSE) PoE channels, such as combining the power supplied through two or more Ethernet cables carrying PoE, to power a single PD.

The traditional method of combining the power from multiple PSE channels is for each PSE channel to have a corresponding PD interface controller and an isolated PD Power Supply (PDPS), where the outputs of all the PDPS's are connected in parallel and to the single PD load. Each of the PSE channels supply the standard voltage, such as 44-57 volts, to the proper pairs of cables in their associated Ethernet cable in accordance to the IEEE PoE specifications. On the PD side, the voltage from each PSE channel is DC-DC converted by separate isolated power supplies (the PDPS's) to the desired voltage needed by the single PD load. All of the PDPS's are then designed so that each one supplies an equal share of the total load current. This necessitates communication between all of the PDPS's. For example, one PDPS may act as the master and another PDPS may act as a slave. The master then controls the slave to operate synchronously with the master to supply one half of the current to the single PD load at a regulated voltage. The power supplies on the PSE side (supplying 44-57 volts) may, optionally, also communicate with each other.

Syncing two or more PDPS's together to supply equal power adds complexity and limits the types of PDPS's that can be used in an Ethernet system.

Therefore, what is needed is a technique for two or more PDPS's to combine their power for a single PD load when the PD load requires more power than one PDPS can supply, where the PDPS's do not have to be synchronized to provide their combined power to the PD load.

SUMMARY

Our method supplies more power to a PD load than can be supplied by a single PoE-compliant PSE channel and associated PDPS. Multiple PDPS's do not need to be synchronized to supply their combined power to the PD load.

It is assumed that a conventional PSE switch has multiple PSE channels, where each channel is traditionally intended to be connected to a different PD using a separate Ethernet cable. Each PSE channel is connected to a single PDPS via the cable.

An example of the present invention is described for supplying power to a single PD load using two or more PDPS's, each connected to a separate PSE channel, such as by a separate Ethernet cable.

Each of the PSE channels is connected to an associated isolated PDPS via a PD interface controller for each PDPS. The PDPS's outputs are then connected in parallel (such as to a PD load power bus) if the voltage converters in the PDPS's use a diode-rectified secondary winding output. If the PDPS's secondary winding output is synchronously rectified (using a synchronous switch), the PDPS outputs are connected in parallel through diodes or ideal diode rectifiers to prevent one PDPS from supplying current to other PDPS's when the synchronous switch is closed.

Due to typical manufacturing tolerances of an isolated PDPS, connecting the outputs of each PDPS in parallel is not sufficient to keep any one of the PDPS from dominating the entire PD load current, since the PDPS outputting the highest voltage would be the only PDPS having a forward biased diode connecting it to the PD load. If one PDPS (in one PD channel) did dominate the PD load, and the load exceeded the maximum current specified by the IEEE standards for a single PSE channel, the corresponding PSE channel would reach its maximum power output limit and that PSE channel would be automatically turned off by current detection circuitry in the PSE specified by the IEEE standards. In other words, the PSE channel would drop its port.

To combat this, in accordance with one embodiment of the invention, an input power limit is provided in each PDPS just below its corresponding PSE channel's rating. When the input power limit level is reached, that PDPS is prevented from providing any additional power to the PD load. Another PSE channel's PDPS then starts contributing power to the PD load while the first PDPS continues to supply its full limited power. This load hand-off scenario will continue for each PDPS until the full PD load current is achieved.

Accordingly, a first PDPS (connected to a first PSE channel), outputting the highest voltage, supplies power to the PD load until the load requires more power than permissible by the first PSE channel. The first PDPS power is then forced to be limited by power-limit circuitry in the PDPS. Then, a second PDPS (connected to a second PSE channel), outputting the next highest voltage, is coupled to the load's power bus, via its forward biased diode, to supply additional power to the load while the first PDPS provides the maximum allowable power. This handoff process continues for each PDPS. The current limits for each PSE channel are specified by the IEEE standards as 350 mA for a Type 1 PSE and 600 mA for a Type 2 PSE, which are convertible to power limits by multiplying the current limits by the voltage supplied by the PSE channel.

An alternative to the above technique is to provide an input current (Iin) limit in each PDPS instead of an input power limit. Each PDPS would have its input current limit set to just below its corresponding PSE channel's cutout current (Icut), which is either 350 mA or 600 mA, mentioned above. Icut is an average current limit.

The techniques described allow each PDPS to get the most available power out of its corresponding PSE channel prior to an additional PDPS being coupled to the load's power bus via a forward biased diode. If different power levels (i.e., Type 1 or Type 2) are available from the different PSE channels, the PDPSs' input power limits or current limits can be automatically modified to match the corresponding PSE channel's capability.

In addition to the IEEE standards for PoE specifying an average current limit (Icut) of either 350 mA (Type 1) or 600 mA (Type 2), the IEEE standards also specify a minimum instantaneous (fast) current limit (Ilim) of either 400 mA (Type 1) or 684 mA (Type 2). If the instantaneous PSE channel current exceeds the fast current limit, the PSE channel could immediately terminate power to the channel. In one embodiment, the PDPS's also include a fast current limiter to prevent instantaneous PSE channel currents exceeding the specified fast current limit. This fast current limiter prevents any current transients into a PDPS from triggering the PSE channel current limit shutdown. One example of a transient is when the PDPS control loop transitions from output voltage control to the input power (or current) limit control as an additional PDPS becomes coupled to the PD power bus to supply additional power to the load. Another example is large, fast PD load transients that could put any particular PSE channel into its Ilim shutdown mode. If a PSE channel is shut down, the PD interface controller will detect an undervoltage and disconnect its associated PDPS from the PSE channel. Keeping any PSE channel out of its Ilim mode will ensure that the PDPS voltage on the PD power bus does not sag due to a PSE channel being dropped.

An advantage of the above technique is that no interconnections or communication bus is needed between PD channels. This is due to the fact that each PD channel configures itself independently based on its own PDPS's operating point and PSE channel's particular power level. This lack of interconnections and communications cuts down on cost, size, and complexity and allows the use of components that do not have a synchronizing capability.

DETAILED DESCRIPTION

Power Over Ethernet (PoE) is a method whereby limited power is transmitted to Ethernet-connected equipment (e.g., VoIP telephones, WLAN transmitters, security cameras, etc.) from an Ethernet switch. DC power from the switch is transmitted over two sets of twisted pair wires in the standard CAT-5 cabling. The same two sets of twisted pair wires may also transmit differential data signals, since the DC common mode voltage does not affect the data. In this way, the need for providing any external power source for the "Powered Devices" (PDs) can be eliminated. The standards for PoE are set out in IEEE 802.3, incorporated herein by reference.

Figure 1:
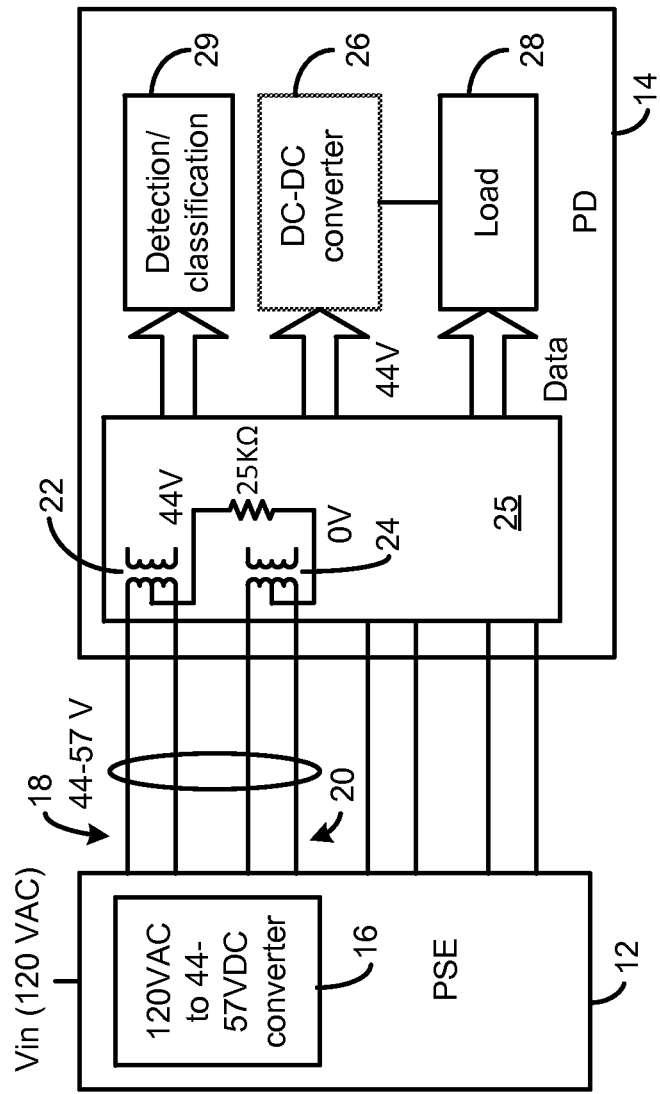
FIG. 1 illustrates a conventional PoE-enabled Ethernet system.

FIG. 1 represents a typical Ethernet system using PoE. A "Power Sourcing Equipment" (PSE) 12 may be any Ethernet device that supplies power and data to a PD 14. The PSE 12 and PD 14 are typically connected via a standard CAT-5 cable terminated with the standard Ethernet 8-pin (four twisted pairs) connector.

The PSE 12 is typically powered by the mains voltage (120 VAC) and uses either an external or internal voltage converter 16 to generate a DC voltage between 44-57 volts. The PoE standards require the PSE 12 to supply at least 37 volts at the input to the PD 14. The voltage drop along the cable increases with distance.

Two of the twisted pairs 18 and 20 are assigned to carry the PoE power, and these pairs may also carry differential data. The remaining two pairs are also shown. All pairs in use are terminated at the PD 14 by transformers, such as transformers 22 and 24. It is assumed that the twisted pair 18 provides 44 volts and the twisted pair 20 is connected to ground. A connection is made to the center tap of transformers 22 and 24 to provide the 44 volts to the PD 14. Since the DC voltage is common mode, it does not affect the differential data. Other conventional termination circuitry is also included in the termination block 25, such as polarity correction circuitry, but is not relevant to the present inventions.

The 44 volts is applied to a DC-DC converter 26 for converting the voltage to any voltage or voltages required by the PD 14. The load 28 (e.g., a security camera) is powered by the converter 26 and communicates with the PSE 12 via the twisted wire pairs.

The IEEE standards require certain low current handshaking procedures between the PSE 12 and PD 14 in order to detect the presence of a PoE-powered device and in order to convey the pertinent characteristics of the PSE 12 and PD 14 prior to the PSE 12 making the full power available to the PD 14. The circuitry for handling the handshaking procedures for PoE and then connecting the supplied voltage from the PSE to the DC-DC converter 26 in the PD 14 is sometimes referred to as the PD interface controller.

Below is a simplified summary of the handshaking protocol between the PSE 12 and the PD 14.

When a PoE-enabled Ethernet cable is plugged into the PD 14, the PSE 12 interrogates the PD 14 to determine if it is PoE-enabled. This period is termed the detection phase. During the detection phase, the PSE 12 applies a current limited voltage ramp to the PD 14, via the twisted wire pairs 18 and 20, and looks for a characteristic impedance from the PD 14 (about 25K ohms) by detecting the resulting current. If the correct impedance is not detected, the PSE 12 assumes that the load is not PoE-enabled and shuts down the PoE generating end. The system then operates as a standard Ethernet system.

If the signature impedance is detected, the PSE 12 moves on to an optional classification phase. The PSE 12 continues to ramp up the voltage to the PD 14. The PSE 12 generates either one pulse (indicating it is a Type 1 PSE) or two pulses (indicating it is a Type 2 PSE). The PD 14 responds to the classification pulses with certain current levels to identify whether the PD 14 is Type 1 or Type 2. A Type 1 PD requires less than 13 W. A Type 2 PD requires up to a maximum of 25.5 W. Various classes (e.g., five classes), each associated with a maximum average current level (Icut) and a maximum instantaneous current level (Ilim), within these types may also be identified. The PSE 12 then uses this power demand information to determine if it can supply the required power to the PD 14, and the PD 14 uses the information to determine if it can fully operate with the PSE 12. There are maximum time windows for the detection and classification phases.

On completion of the detection and classification phases, the PSE 12 ramps its output voltage above 42 V. Once an under-voltage lockout (UVLO) threshold has been detected at the PD 14, an internal FET is turned on. At this point, the PD 14 begins to operate normally, and it continues to operate normally as long as the input voltage remains above a required level.

The handshaking phase and connection of the PSE voltage to the DC-DC converter 26 are performed by a conventional detection/classification circuit 29, also referred to as a PD interface controller.

The configuration of FIG. 1 is adequate if the PD load 28 can be completely powered by the single PSE channel supplying power over the twisted wire pairs 18 and 20. However, a user may desire to provide a load that requires, either constantly or intermittently, a power level greater than can be provided by a single PSE channel. The inventive circuit of FIG. 2 may be used to supply power from multiple PSE channels to a single PD load.

Figure 2:
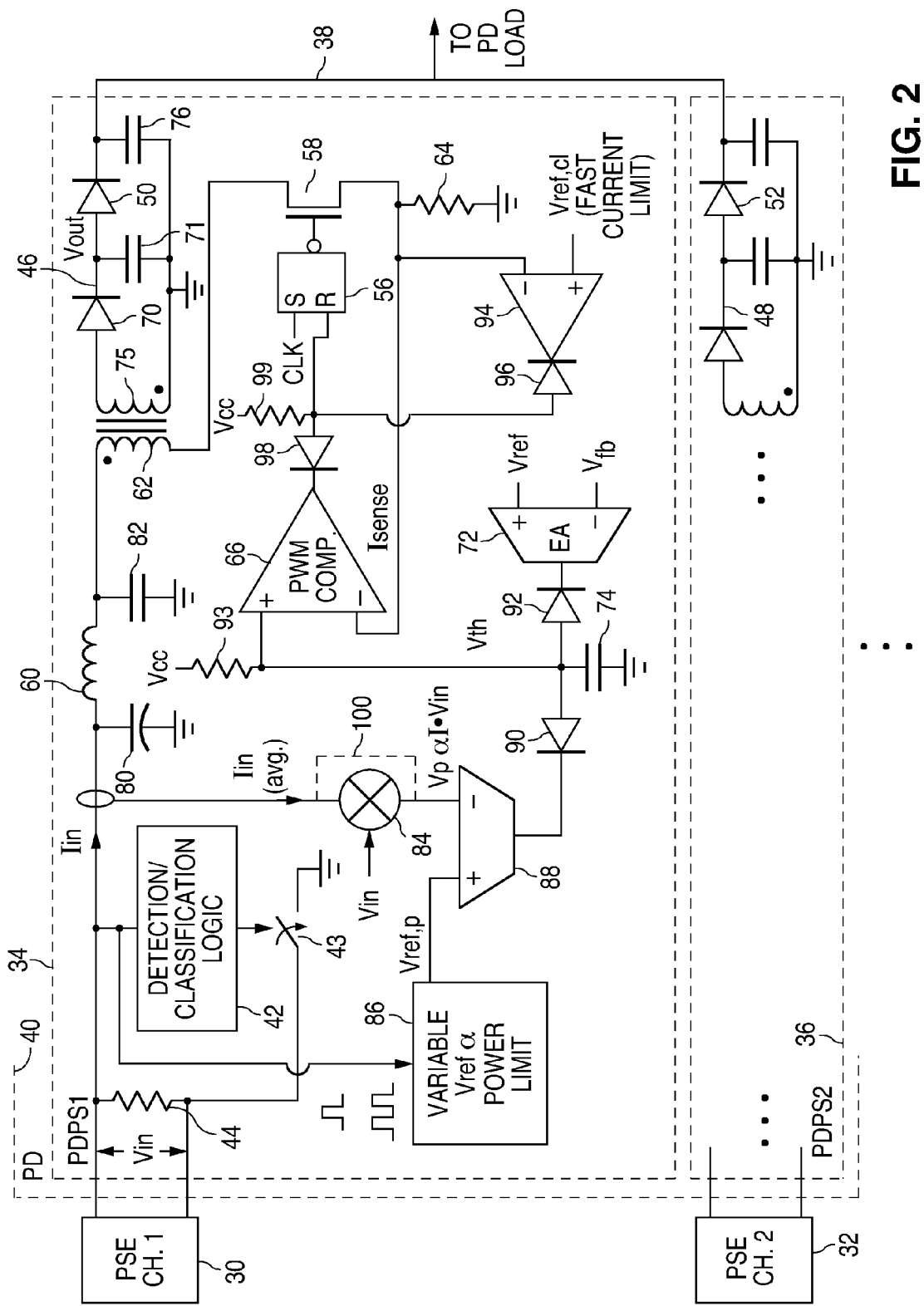
FIG. 2 illustrates a PoE-enabled Ethernet system where multiple isolated power supplies on the Powered Device (PD) side operate independently to combine their output power for a single PD load while complying with the IEEE standards for PoE.

In FIG. 2, only two PSE channels 30 and 32 are shown, but any number of PSE channels may be used with the present invention. Each PSE channel may be identical to the single PSE channel shown in FIG. 1.

Each PSE channel 30/32 is connected to an associated PDPS 34 and 36, respectively. The output of each PDPS 34/36 is connected to a power bus 38 that supplies power to a single PD load. The PDPS's 34 and 36 may be housed in a single PD 40 that has two or more Ethernet connectors for connection to the two PSE channels 30 and 32 via Ethernet cables or other wiring configurations.

A conventional detection/classification logic circuit 42, described above, performs the handshaking phase and connects the PSE channel voltage (about 44 volts) to the input of the voltage converter in the PDPS 34/36 via switch 43. The logic circuit 42 is programmed to identify the PDPS as a Type 1 (13 W maximum) or Type 2 (25.5 W maximum), as described above, so the PSE channel 30/32 can determine whether it can supply the requested power level and apply the corresponding current limits.

In the example of FIG. 2, it is assumed that the PDPS's 34 and 36 are Type 1, having average (or slow) current limits of 350 mA and instantaneous (or fast) current limits of 400 mA. The average current limit is the current averaged over a specified time constant period.

A 25K ohm resistor 44 identifies that the PDPS 34/36 is PoE compatible. The logic 42 may switch out the resistor 44 after the handshaking phase.

It is assumed that the PD load requires a maximum power greater than 13 W and less than 25.5 W, so that a single PDPS 34 or 36 (each only capable of supplying up to 13 W) is unable to supply all the power required by the PD load.

Each PDPS 34/36 has its Vout terminal 46/48 connected to the power bus 38 via a diode 50/52. The diode 50/52 will only become forward biased if the Vout for an associated PDPS 34/36 is about 0.7 volts greater than the voltage on the bus 38 (or about 0.5 volts if Schottky diodes are used). Due to various tolerances, the Vout's of the various PDPS's will differ slightly, so, initially, one of the diodes 50/52 will conduct first while the other diode will be reverse biased until the bus 38 voltage becomes 0.7 volts less than the Vout applied to the anode of the diode 50/52. In one embodiment, the PDPS's 34/36 output approximately 5 volts so comprise step down converters.

The diodes 50/52 will both be conductive if the Vout's of each PDPS 34/36 are the same, thus allowing both PDPS's 34 and 36 to supply current to the load.

Many types of DC-DC converters may be used in conjunction with the present inventive technique of allowing power from multiple power supplies to be combined for a single load without requiring synchronizing. The DC-DC converter in the example of FIG. 2 operates as follows.

Upon the beginning of a clock cycle, a clock signal CLK sets an RS flip flop 56 to apply a logical high voltage to the gate of the MOSFET 58 to turn it on.

Current is then conducted through the inductor 60 and the primary winding 62 of the isolation transformer. A ramping current flows through a low value sense resistor 64 to generate a ramping Isense voltage. Isense is applied to one input of a pulse width modulation (PMW) comparator 66.

The ramping current through the primary winding 62 charges the transformer. Diode 70 is off at this time.

The output capacitor 71 is assumed to have been charged to Vout from previous charging cycles. Vout is connected to a resistor divider (not shown) to create a divided feedback voltage Vfb. Alternatively, Vfb may be generated by a third winding of the transformer for isolating the feedback circuitry from the Vout terminal.

An error amplifier 72 (a transconductance amplifier) receives Vfb and a reference voltage Vref, and the output current of the error amplifier 72 charges or discharges the compensation capacitor 74 to generate a threshold voltage Vth. Vth is connected to another input of the PWM comparator 66. When the ramping Isense crosses Vth, the PWM comparator 66 triggers to reset the RS flip flop 56 to turn off the MOSFET 58 until the next clock cycle. The turning off of the MOSFET 58 reverses the voltage across the secondary winding 75 to forward bias the diode 70. The current through the secondary winding 75 charges the output capacitor 71, which smoothes the output voltage Vout, and provides current to the load.

The current and voltage feedback loops adjust the level of Vth, which controls the duty cycle of the MOSFET 58, to make Vfb equal to Vref. The resistor values in the resistor divider (not shown) or the number of turns of the third winding are selected to create the desired Vout.

The converter in the PDPS 36 is ideally identical to the converter in the PDPS 34, but due to component and process tolerances, the Vout's of the two converters will differ slightly. It will be assumed that the Vout of PDPS 34 is slightly greater than the Vout of PDPS 36.

After both PDPS's 34 and 36 have completed their handshaking phases and have reached their steady state Vout levels, only diode 50 will be forward biased to couple the Vout from the PDPS 34 to the bus 38, since the Vout of the PDPS 36 is assumed to be slightly lower than the Vout of the PDPS 34. The capacitor 76 provides smoothing between the bus 38 and Vout to prevent transients on the bus 38 from turning the diode 50 off.

It is assumed the PSE channels 30/32 and the PDPS's 34/36 are Type 1, which has a maximum allowable power of 13 W. The maximum allowable average current supplied by each PSE channel 30/32 is 350 mA, and the maximum allowable instantaneous current supplied by each PSE channel 30/32 is assumed to be 400 mA, in accordance with the IEEE standards for Type 1 PoE.

If the PD load connected to the bus 38 only requires less than 13 W, only the PDPS 34 is needed to supply all the power to the load, and the diode 52 in the PDPS 36 will remain reverse biased.

In the event that the load requires more than 13 W either continuously or temporarily, the following inventive technique and circuitry come into play. Each PoE-enabled PDPS connected to the bus 38 has the same circuitry and operates the same.

The inductor 60 and capacitors 80 and 82 average (low pass filter) the input current Iin from the PSE channel 30 so there is little ripple due to the switching of the MOSFET 58. A low value sense resistor in series with the inductor 60 may be used to detect Iin, where a differential amplifier connected across the resistor generates a voltage proportional to Iin.

This voltage proportional to Iin is connected to a multiplier 84 along with a voltage appropriately proportional to Vin, such that the output of the multiplier 84 is a value Vp proportional to the average power (Vin×Iin) supplied by the PSE channel 30.

A logic block 86 generates a power reference voltage Vref,p corresponding to either a Type 1 power of 13 W or a Type 2 power of 25.5 W, depending on the type detected during the handshaking phase. One pulse detected during the handshaking phase indicated a Type 1 system, and two pulses detected during the handshaking phase indicated a Type 2 system.

The values Vref,p and Vp are applied to inputs of a power limit amplifier 88 (a transconductance amplifier) which sinks a current at its output only when Vp exceeds Vref,p. In other words, the amplifier 88 only sinks a current at its output when the power required by the load exceeds the allowable power supplied by the PSE channel 30.

When the amplifier 88 sinks current, the diode 90 is turned on, which maintains Vth at a level so that the converter cannot supply any more than 13 W to the bus 38. Thus, the current drawn by the amplifier 88 is just sufficient to keep Vth at the power limit level.

In the present example, limiting the power is essentially the same as limiting the input current Iin since Vin is specified by the IEEE standards to be within a certain range. Since Vin is approximately known, the power may be approximately known simply by measuring the input current.

A diode 92 is connected between the error amplifier 72 and the compensation capacitor 74 to prevent the error amplifier 72 from sourcing current into the power limit amplifier 88. A weak pull-up resistor 93 is connected to the capacitor 74 to charge it to Vth, while the error amplifier 72 and power limit amplifier 88 only serve to draw charge from the capacitor 74 to provide the feedback control.

The circuit of FIG. 2 also limits the instantaneous current into the PD 34 to prevent the PSE channel 30 from exceeding its fast current limit. The Isense signal is connected to one input of a current limit comparator 94, and a fast current limit reference voltage Vref,cl is connected to the other input. Vref,cl is a value associated with a peak current through the primary winding 62 that corresponds to the fast current limit (e.g., 400 mA) of the PSE channel 30. If Isense exceeds Vref,cl, the comparator 94 generates a low voltage, which forward biases the diode 96 and immediately resets the RS flip flop, shutting down the MOSFET 58. Thus, the duty cycle is limited to prevent any instantaneous current from triggering the fast current limit mode of the PSE channel 30.

The optional diode 98 connected to the PWM comparator 66 prevents the PWM comparator 66 from sourcing current into the amplifier 94. If the diode 98 is used, a weak pull-up resistor 99 at the reset input of the RS flip flop 56 is used to weakly bias the reset terminal of the RS flip flop 56 so that either the PWM comparator 66 or the current limit amplifier 94 can pull down the reset terminal when they are triggered to turn off the MOSFET 58.

Assuring that the instantaneous current limit of the PSE channel 30/32 will not be exceeded may also be accomplished by detecting an instantaneous input current at any suitable node in the PDPS 34/36. Exceeding the instantaneous current limit may indicate that there is an anomaly in the PD load or a transient, so the limiting of the duty cycle of the converter in the PDPS may be permanent (until the load is replaced) or temporary.

Once the PDPS 34 output voltage Vout becomes limited by the limiting of Vth or by the fast current limit, the current demand of the PD load will pull down the Vout of the PDPS 34. This causes the voltage on the bus 38 to slightly lower, resulting in the diode 52 of the PDPS 36 to now become forward biased. The current generated by the PDPS 36 is now supplied to the bus 38 so the bus 38 remains at the desired voltage. Both diodes 50 and 52 are therefore forward biased to conduct current to the load, while the PDPS 34 is supplying its maximum power of 13 W and the PDPS 36 is supplying any additional power required by the load.

Any number of PDPS's may be connected in parallel, as indicated by the ellipsis in FIG. 2. If additional PDPS's were connected to the bus, the PDPS that outputted the highest Vout would have its output diode (e.g., diode 50, 52) first forward biased and deliver up to its maximum power of 13 W (for Type 1) or 25.5 W (for Type 2). Once that maximum power has been reached, the PDPS outputting the next highest Vout would have its output diode forward biased and provide any additional power to the load until it reached its maximum power. The remainder of the PDPS's would the similarly contribute power in the same handoff sequence. Accordingly, a wide range of power may be delivered to a PD load while conforming to the PoE standards, where the PDPS's do not need to communicate with each other to operate synchronously, in contrast to the prior art. Further, the PSE channels do not need to communicate with one another to combine their powers. This allows the inventive PDPS's 34 and 36 to be replaced with conventional PDPS's in the event that the PD load can be powered by a single conventional PDPS.

The capacitor 76 at the output of each PDPS smoothes any transient when a PDPS has just been connected to the power bus 38 by its forward biased diode (e.g., 50, 52).

In another embodiment, the input power is not detected by multiplying Iin by Vin but rather only Iin is detected and compared to a threshold by the amplifier 88. This is shown by the dashed line connection 100 bypassing the multiplier 84. In such a case, the value Vref,p is set to just below the "slow" current limit of the PSE channel (e.g., 350 mA or 600 mA). The logic block 86 detects the type of PSE or PD and sets the slow current limit accordingly. Detecting the power is not required since the PSE channel voltage is approximately known (set by IEEE standards), so the "slow" current limit approximately corresponds to the allowable maximum power.

In another embodiment, both power and current are detected in each PDPS and compared to a power threshold and a current threshold for limiting both power and current.

The PDPS's 34 and 36 are shown using diode (e.g., diode 70) rectification; however, a synchronous rectifier (e.g., a MOSFET) may be used instead and controlled to switch oppositely to MOSFET 58. If the PDPS's use a synchronous rectifier, the PDPS outputs should still be connected to the bus 38 via diodes 50/52 to prevent one PDPS from supplying current to other PDPS's. An ideal diode rectifier may also be used for 50/52 that compares voltages and triggers a low-loss switch upon the desired polarity being detected. Any diode or switch coupling a PDPS to the common load is generically referred to herein as a polarity detection device, which automatically couples the PDPS to the load only when the voltage generated by the PDPS is approximately equal to or greater than the voltage already connected to the load.

Any of the features described herein may be combined. The invention is independent of the type of power converter used in the PDPS. The converter may be a step down or a step up converter (or a combination), a current mode converter, a voltage mode converter, or any other type of converter. FIG. 2 shows a current mode converter. A voltage mode converter may just compare Vth to a ramping oscillator signal.

Each PDPS may be connected to its associated PSE channel via a standard Ethernet cable or any other suitable conductor. The PD load may be any type of load, including loads that use a wide range of power levels. The PSE channels may be in a single Ethernet switch or be from separate PoE sources sold by different manufacturers. The PSE channels may be a combination of different types (e.g., IEEE standard Type 1 and 2, or a proprietary PoE standard) and the PDPS's may be a combination of different types. The PDPS's 34/36 may be in the same housing as the PD load or provided separately.

While particular embodiments of the present invention have been shown and described, it will be obvious to those skilled in the art that changes and modifications may be made without departing from this invention in its broader aspects and, therefore, the appended claims are to encompass within their scope all such changes and modifications that are within the true spirit and scope of this invention.

What is claimed is:

1. A method for combining power to a load from multiple power supplies via power over Ethernet (PoE), the power supplies being coupled to associated power sourcing equipment (PSE) providing PoE, the associated PSE comprising at least a first PSE and a second PSE, each PSE providing power at its power output terminals, each PSE having at least one of a first power limit or a first current limit, the method comprising:

providing at least a first power supply and a second power supply, the first power supply being coupled to the first PSE and the second power supply being coupled to the second PSE;

coupling an output of the first power supply to a first load power terminal for supplying power to the first load by only the first power supply until it is detected that at least one of a power or a current supplied by the first PSE to the first power supply equals a first power threshold or a first current threshold, respectively, and, in response, limiting a power or current output of the first power supply to the first load to ensure that the current supplied by the first PSE does not exceed the first power limit or the first current limit; and automatically detecting by the second power supply that the power or current output of the first power supply has been limited and, in response, coupling the second power supply to the first load power terminal for supplying additional power to the first load while the power or current supplied by the first power supply remains limited.

2. The method of claim 1 further comprising:

converting a voltage supplied by the first PSE to a first output voltage by the first power supply;

converting a voltage supplied by the second PSE to a second output voltage by the second power supply;

providing a first polarity detection device selectively coupling the first output voltage of the first power supply to the first load power terminal;

providing a second polarity detection device selectively coupling the second output voltage of the second power supply to the first load power terminal;

detecting by the first polarity detection device that the first output voltage generated by the first power supply is greater than a voltage at the first load power terminal and, in response to such detection, connecting the output of the first power supply to the first load power terminal to provide power from the first power supply to the first load, wherein the step of limiting the power or current output of the first power supply to the first load causes the voltage at the first load power terminal to be lowered; and detecting by the second polarity detection device that the second output voltage generated by the second power supply is greater than the voltage at the first load power terminal and, in response to such detection, connecting an output of the second power supply to the first load power terminal to provide additional power from the second power supply to the first load while the first power supply is providing the limited power or current.

3. The method of claim 2 wherein the first polarity detection device is a first diode, and the second polarity detection device is a second diode.

4. The method of claim 1 wherein the step of detecting whether the power or current provided by the first PSE to the first power supply equals the first power threshold or the first current threshold comprises detecting whether the power provided by the first PSE to the first power supply equals the first power threshold.

5. The method of claim 1 wherein the step of detecting whether the power or current provided by the first PSE to the first power supply equals the first power threshold or first current threshold comprises detecting whether the current provided by the first PSE to the first power supply equals the first current threshold.

6. The method of claim 1 wherein the first power supply is identical to the second power supply.

7. The method of claim 1 wherein the first power supply and the second power supply comprise isolated step down converters.

8. The method of claim 1 further comprising the first power supply and the second power supply each detecting an average current supplied by the first PSE and the second PSE, respectively, for comparison to the first current threshold.

9. The method of claim 1 further comprising:

detecting whether a current in the first power supply equals a second threshold current so as not to exceed an instantaneous current limit for the first PSE and, in response to such detection, limiting a current input into the first power supply to prevent current supplied by the first PSE exceeding the instantaneous current limit.

10. The method of claim 9 wherein detecting whether the current in the first power supply equals the second threshold current comprises detecting an instantaneous current through a power switch in the first power supply.

11. The method of claim 1 wherein the first PSE and the second PSE supply power to dedicated wire pairs in accordance with IEEE standard 802.3.

12. The method of claim 1 wherein the first power supply comprises a first voltage converter having a duty cycle being controlled such that the first voltage converter outputs a regulated voltage, wherein the step of limiting the power or current output of the first power supply comprises limiting the duty cycle of the first voltage converter, whereby a voltage at the first load power terminal lowers due to the duty cycle being insufficient to supply current to the first load at the regulated voltage.

13. The method of claim 1 where there are no connections between the first power supply and the second power supply for synchronizing operation of the first power supply and the second power supply.

14. The method of claim 1 wherein the first PSE is a first PSE channel of a PSE switch and the second PSE is a second PSE channel of the PSE switch.

15. The method of claim 1 further comprising:
performing a handshaking routine between the first PSE and the first power supply, the handshaking routine identifying the first power limit or the first current limit of each PSE; and
automatically setting the first power threshold or the first current threshold to correspond with the first power limit or the first current limit identified during the handshaking routine.

16. A system for combining power to a load from multiple power supplies via power over Ethernet (PoE), the power supplies being coupled to associated power sourcing equipment (PSE) providing PoE, the associated PSE comprising at least a first PSE and a second PSE, each PSE providing power at its power output terminals, each PSE having at least one of a first power limit or a first current limit, the system comprising:
at least a first power supply and a second power supply, the first power supply for being coupled to the first PSE and the second power supply for being coupled to the second PSE,
the first power supply comprising a first voltage converter for converting a voltage supplied by the first PSE to a first output voltage of the first power supply;
the second power supply comprising a second voltage converter for converting a voltage supplied by the second PSE to a second output voltage of the second power supply;
a first polarity detection device selectively coupling the first output voltage of the first power supply to a first load power terminal when it is determined that the first output voltage of the first power supply is greater than the voltage at the first load power terminal;
a second polarity detection device selectively coupling the second output voltage of the second power supply to the first load power terminal when it is determined that the second output voltage of the second power supply is greater than the voltage at the first load power terminal; and
a first detector in the first power supply for detecting that at least one of a power or a current supplied by the first PSE to the first power supply equals a first power threshold or a first current threshold, respectively, and, in response, limiting a power or current output of the first power supply to the first load power terminal to ensure that the power or current supplied by the first PSE does not exceed the first power limit or the first current limit, respectively, wherein limiting the power or current output of the first power supply to the first load power terminal causes the voltage at the first load power terminal to be lowered,
wherein the second polarity detection device couples the second power supply to the first load power terminal in response to the power or current output of the first power supply being limited to provide additional power from the second power supply to the first load power terminal while the first power supply is providing the limited power or current.

17. The system of claim 16 wherein the first polarity detection device is a first diode, and the second polarity detection device is a second diode.

18. The system of claim 16 wherein the first detector detects that the power supplied by the first PSE to the first power supply equals the first power threshold.

19. The system of claim 16 wherein the first detector detects that the current supplied by the first PSE to the first power supply equals the first current threshold.

20. The system of claim 16 wherein the first current limit is an average current limit.

21. The system of claim 16 further comprising a second detector in the first power supply for detecting that an instantaneous current at a node in the first power supply equals a second current threshold and, in response, limiting a current output of the first power supply to the first load power terminal to ensure that the current supplied by the first PSE does not exceed an instantaneous current limit of the first PSE, wherein limiting the current output of the first power supply to the first load power terminal causes the voltage at the first load power terminal to be lowered.

22. The system of claim 16 wherein a handshaking routine is performed between the first PSE and the first power supply, the handshaking routine identifying the first power limit or the first current limit of each PSE, the system further comprising a logic circuit for automatically setting the first power threshold or the first current threshold to correspond with the first power limit or the first current limit identified during the handshaking routine.

23. The system of claim 16 wherein the first power supply comprises a feedback circuit generating a threshold voltage for setting a duty cycle of a power switch, wherein the first detector limits the threshold voltage after detecting that the power or current supplied by the first PSE to the first power supply equals the first power threshold or the first current threshold, respectively.

* * * * *